US008251246B2

(12) United States Patent  
Laurin

(10) Patent No.: US 8,251,246 B2  
(45) Date of Patent: Aug. 28, 2012

(54) PARTITIONED CONTAINER WITH SYSTEM FOR SELECTIVELY PROVIDING ACCESS TO A SELECTED COMPARTMENT

(76) Inventor: Michel Laurin, Mirabel (CA)

(*) Notice: Subject to any disclaimer, the term of this patent is extended or adjusted under 35 U.S.C. 154(b) by 296 days.

(21) Appl. No.: 12/654,004

(22) Filed: Dec. 8, 2009

(65) Prior Publication Data

US 2010/0181320 A1 Jul. 22, 2010

Related U.S. Application Data

(60) Provisional application No. 61/193,562, filed on Dec. 8, 2008.

(51) Int. Cl.  
*B65D 1/24* (2006.01)  
*B65D 45/16* (2006.01)

(52) U.S. Cl. ........................ 220/524; 220/326

(58) Field of Classification Search .............. 220/524, 220/523, 526, 254.6, 254.3, 254.2, 254.1, 220/826, 810, 500; 292/57, 32; 222/138, 222/132; *B65D 1/24, 1/22, 25/04*  
See application file for complete search history.

(56) References Cited

U.S. PATENT DOCUMENTS

| | | | | |
|---|---|---|---|---|
| 247,316 A * | 9/1881 | Hodge | ........................ | 220/524 |
| 396,515 A * | 1/1889 | Shuman | ........................ | 220/254.2 |
| 2,921,710 A * | 1/1960 | Hutterer | ........................ | 220/254.3 |
| 3,687,317 A | 8/1972 | Gagel | | |
| 4,182,530 A | 1/1980 | Hodge | | |
| 4,520,945 A * | 6/1985 | Hodge | ........................ | 220/315 |
| 4,804,113 A * | 2/1989 | Ciaccio | ........................ | 222/142.1 |
| 4,955,501 A * | 9/1990 | Hodge | ........................ | 220/315 |
| 5,071,307 A | 12/1991 | Carson | | |
| 5,074,737 A | 12/1991 | Pellegrini et al. | | |
| 5,094,582 A | 3/1992 | Molzhon | | |
| 5,098,250 A | 3/1992 | Carson | | |
| 5,163,805 A | 11/1992 | Mezey | | |
| 5,171,119 A | 12/1992 | Carson | | |
| 5,205,698 A | 4/1993 | Mezey | | |
| 5,213,382 A | 5/1993 | Dawdy et al. | | |
| 5,224,743 A * | 7/1993 | Dawdy et al. | ................. | 292/228 |
| 5,244,218 A | 9/1993 | Irwin, Sr. | | |
| 5,490,606 A | 2/1996 | Lombardo | | |
| 5,971,196 A | 10/1999 | Gamache | | |
| 6,102,283 A | 8/2000 | Kann | | |
| 2009/0066092 A1 | 3/2009 | Reeb | | |

FOREIGN PATENT DOCUMENTS

| | | |
|---|---|---|
| EP | 0 528 810 81 | 3/1993 |
| WO | WO 93/01111 | 1/1993 |
| WO | WO 96/11155 | 4/1996 |
| WO | WO 02/088002 A1 | 11/2002 |

* cited by examiner

*Primary Examiner* — Mickey Yu  
*Assistant Examiner* — Robert J Hicks

(57) ABSTRACT

A container including a top wall, the top wall defining a container first aperture and a container second aperture. A first and a second lid are provided. The first and second lid are configured so as to be each movable between a lid closed position and a lid opened position for selectively blocking and freeing respectively the container first and second apertures. A lock is configurable between a lock first configuration and a lock second configuration. In the lock first configuration, the container first lid is locked in the closed position by the lock and the container second lid is freely movable between the opened and closed positions. In the lock second configuration, the container second lid is locked in the closed position by the lock and the container first lid is freely movable between the opened and closed positions.

19 Claims, 4 Drawing Sheets

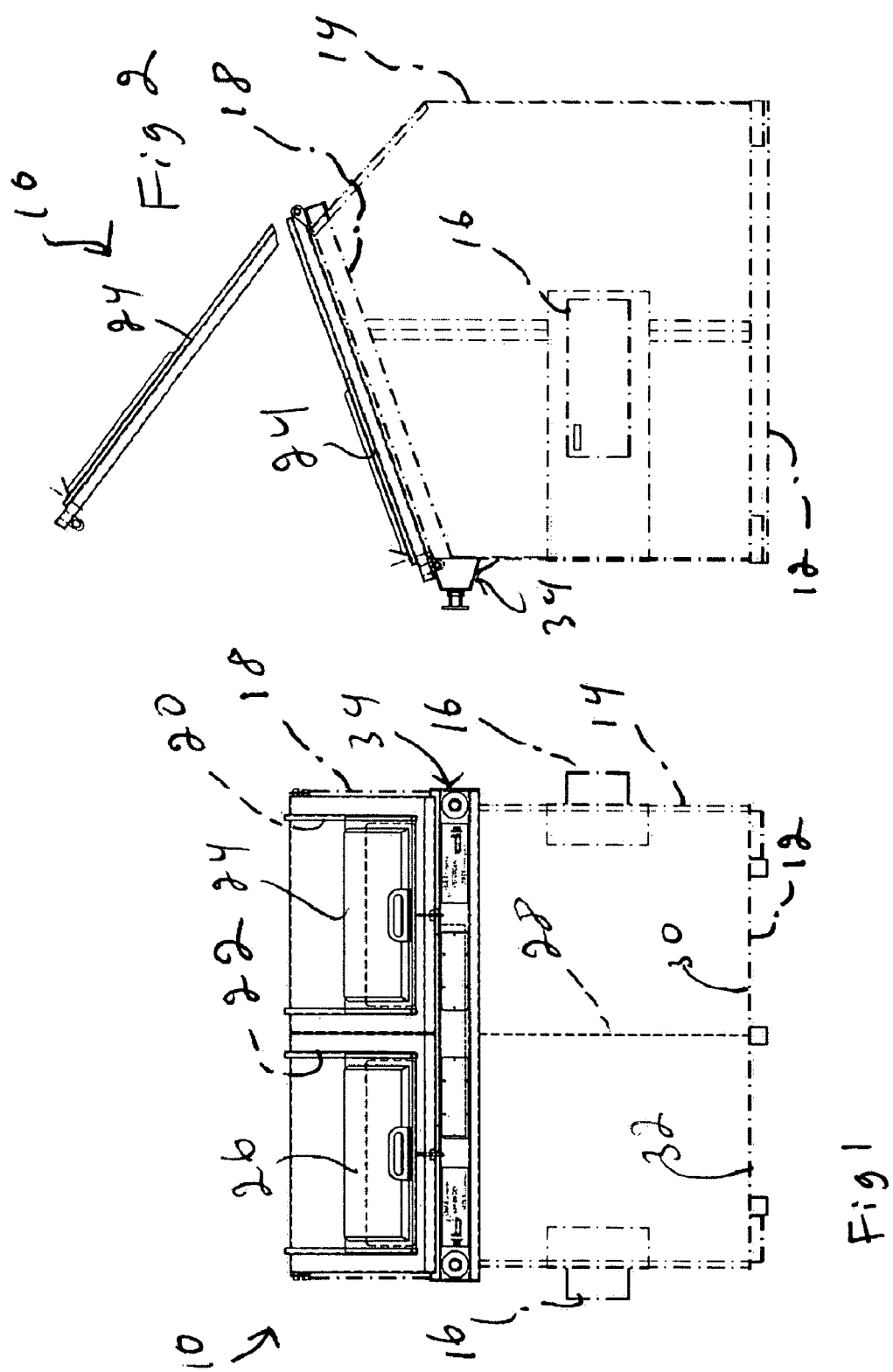

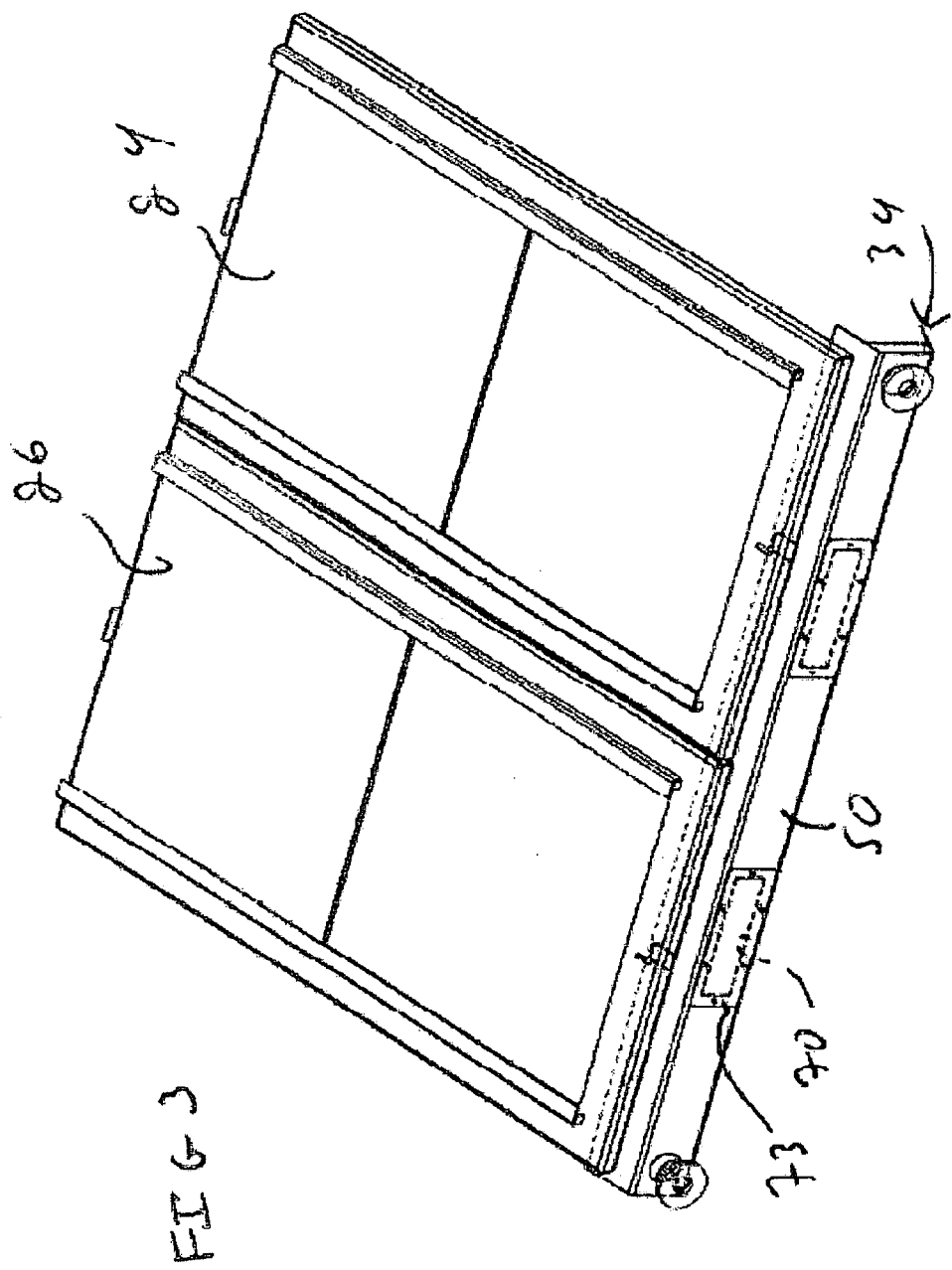

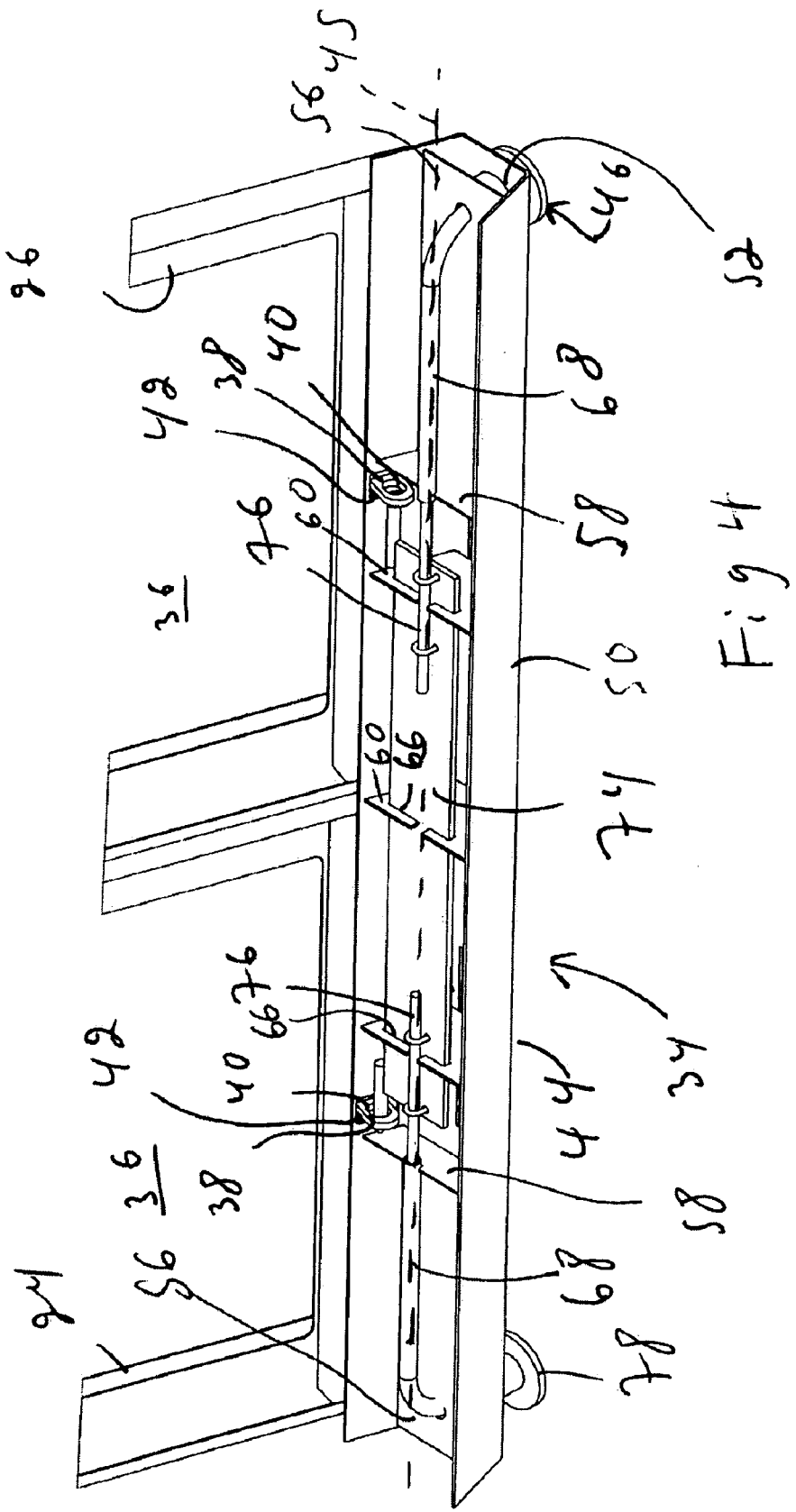

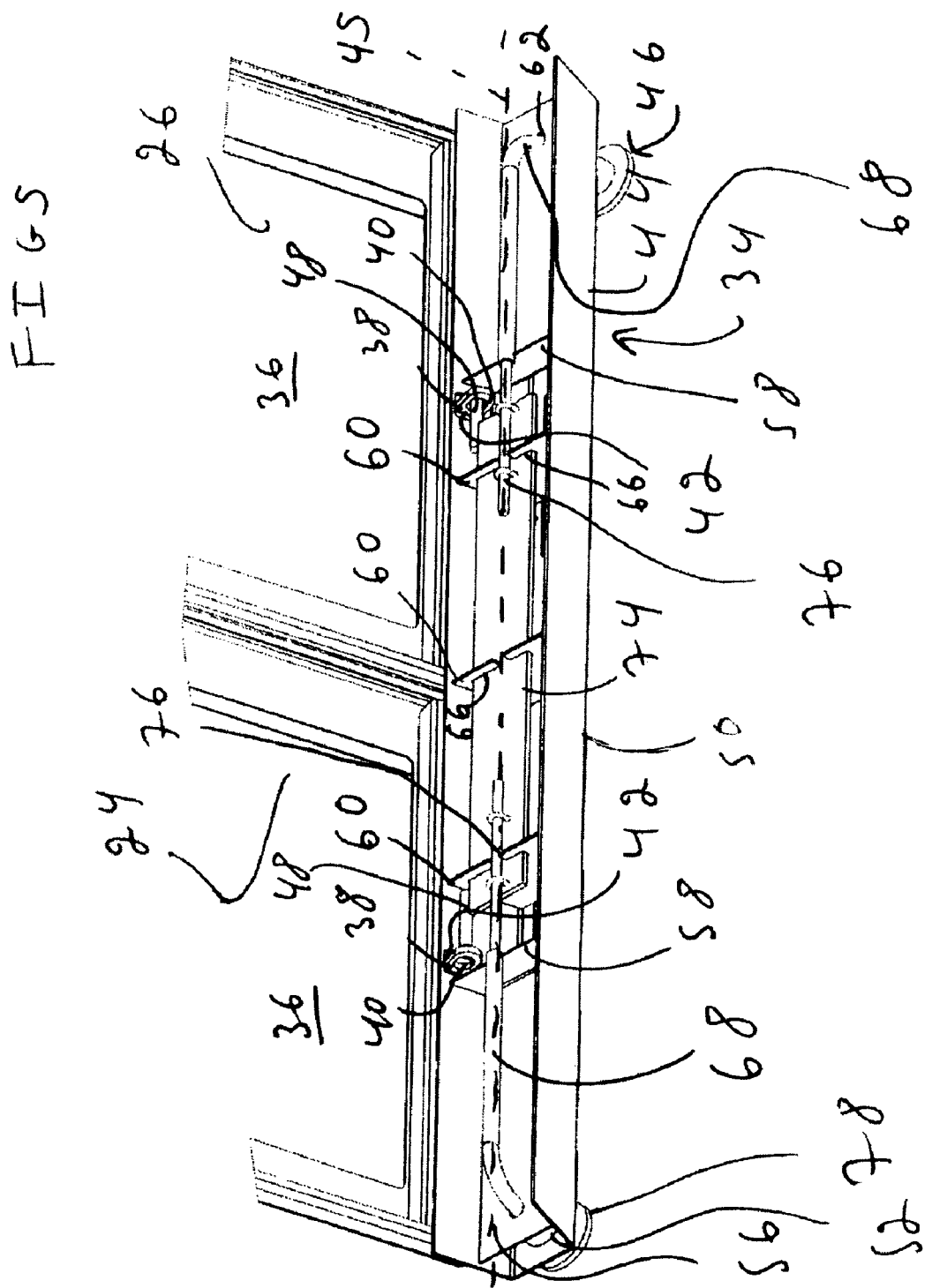

PARTITIONED CONTAINER WITH SYSTEM FOR SELECTIVELY PROVIDING ACCESS TO A SELECTED COMPARTMENT

This Application claims priority from U.S. Provisional Patent Application Ser. No. 61/193,562 filed Dec. 8, 2008.

FIELD OF THE INVENTION

The present invention relates to the general field of containers, and is more specifically concerned with a partitioned container with system for selectively providing access to a selected compartment.

BACKGROUND

It has become common in the waste collection industry to recycle some materials. To improve efficiency in the recycling process, it is often asked of consumers that get rid of their wastes to separate the wastes in two or more categories. For example, users may be asked to separate paper, cardboard and similar materials in one container and to separate glass, plastic, metal and similar materials in another container.

To improve the efficiency of the waste collecting process and reduce cluttering of the space in which the waste is disposed of, it has become common to have containers that have two or more compartments for selectively receiving the different categories of wastes. Then, when the contractor responsible for collecting the wastes comes to the collection site, all compartments except the one for which the contractor is responsible are locked and the container, which is typically relatively large, is lifted and turned upside down so that the wastes can flow through a top apertures of the container.

Typically, this operation is performed with containers that have top apertures that are covered by lids. By selectively locking all the lids except one, turning the container upside down will result in only the contents of the compartment corresponding to the unlocked lid to flow out of the container.

Due to the relatively large number of sites a given contractor visits in a single day, it is advantageous to have mechanisms that allow for selectively locking and unlocking different lids without the operator having to leave his truck. To that effect, many mechanisms have been designed that allow such selective locking and unlocking of compartments in a container. However, they are often relatively difficult to operate by an intended user driving a truck as they require relatively precise steering of the truck and relatively precise operation of a fork lift used to lift a container to properly lock the right compartment. Also, operation of currently existing locks is typically relatively confusing as there is little indication regarding the exact manipulation that must be performed to lock and unlock the right compartments.

Against this background, there exists a need in the industry to provide an improved multi-compartment container. An object of the present invention is therefore to provide such a container.

SUMMARY OF THE INVENTION

In a broad aspect, the invention provides a container. The container includes a top wall, the top wall defining a container first aperture and a container second aperture. A first and a second lid are provided and mounted to the container top wall. The first and second lids are each movable between a lid closed position and a lid opened position for selectively blocking and freeing respectively the container first and second apertures. A lock is configurable between a lock first configuration and a lock second configuration. In the lock first configuration, the container first lid is locked in the closed position by the lock and the container second lid is freely movable between the opened and closed positions. In the lock second configuration, the container second lid is locked in the closed position by the lock and the container first lid is freely movable between the opened and closed positions.

In another broad aspect, the invention provides a container, the container comprising: a container bottom wall; a container peripheral wall extending substantially upwardly from the container bottom wall; a container top wall extending from the container peripheral wall substantially opposed to the container bottom wall, the container top wall defining a container first aperture and a container second aperture each extending therethrough; a first lid and a second lid, the first and second lids being operatively coupled to the container so as to be each movable between a lid closed position and a lid open position for respectively selectively blocking and freeing a respective one of the container first and second apertures; and a lock, the lock being configurable between a lock first configuration and a lock second configuration. In the lock first configuration, with the first lid in the lid closed position, the first lid is locked in the lid closed position by the lock and the second lid is freely movable between the lid open and closed positions. In the lock second configuration, with the second lid in the lid closed position, the second lid is locked in the lid closed position by the lock and the first lid is freely movable between the open and closed positions.

Typically, the container internal wall extends substantially upwardly from the container bottom wall within the container peripheral wall and divides the container into a first compartment and a second compartment. The first and second compartments are configured and sized such that the container first and second apertures allow respectively exclusive access to the first and second compartments.

Typically, the lock includes a lock actuator for selectively moving the lock between the lock first and second configurations.

Typically, the first and second lids are hingedly attached to the container top wall respectively substantially adjacent the container first and second apertures so as to be each pivotable between the lid closed and opened positions.

Each of the first and second lids includes a lid body configured and sized for substantially obstructing respectively the container first and second apertures when respectively the first and second lids are in the closed positions; and a lid locking element extending from the lid body for selectively locking the first and second lids in the lid closed positions in cooperation with the lock.

In an example of implementation, the lid locking elements each include a lid locking flange defining a respective lid locking aperture; and the lock includes two locking pins movable in a reciprocating movement relatively to the lid locking flanges when the lock is moved between the lock first and second configurations, a first one of the locking pins being inserted in the lid locking aperture of the first lid and a second one of the locking pins being retracted from the lid locking aperture of the second lid when the lock is in the lock first configuration, the first one of the locking pins being retracted from the lid locking aperture of the first lid and the second one of the locking pins being inserted in the lid locking aperture of the second lid when the lock is in the lock second configuration.

Typically, the first and second lids are hingedly attached to the container top wall substantially opposed to the lid locking flanges.

In a variant, the lock includes a lock actuator for selectively moving the lock between the lock first and second configurations, the lock actuator being operatively coupled to the locking pins for moving the locking pins with respect to the lid locking flanges when the lock actuator is actuated.

For example, the lock actuator includes two buttons, the buttons causing the locking pins to move in opposite directions with respect to the lid locking flanges when the button are pushed. In a specific example, the buttons are provided in a substantially side-by-side relationship with respect to each other.

Typically, the lock includes a lock body having a substantially elongated configuration and extending along the container peripheral wall substantially adjacent the container top wall, the lock actuator including an actuator base mounted to the lock body between the lid locking flanges so as to be movable substantially longitudinally with respect to the lock body in a reciprocating movement along the lock body, the locking pins being mounted to the actuator base, the lock actuator further including a pair of actuating cables extending from the actuator base in substantially opposite directions oriented substantially longitudinally with respect to the lock body, the actuating cables protruding from the lock body. For example, the locking pins extend each longitudinally from the actuator base in substantially opposite directions longitudinally oriented with respect to the lock body and the two buttons are each secured to a respective one of the actuating cables outside of the lock body.

Typically, the lock includes a pair of substantially L-shaped sheaths secured to the lock body substantially longitudinally opposed to each other, each of the actuating cables extending through a respective one of the sheaths so as to protrude outwardly from the lock body substantially transversely. For example, the sheaths are substantially rigid and the buttons are secured to the actuating cables substantially adjacent a respective one of the sheaths.

Advantageously, the proposed lock is relatively easily operable by an intended user driving a conventional fork lift equipped truck. Also, in some embodiments of the invention, the lock includes an actuator operated through buttons that are relatively easily pressed using the force of the fork lift to selectively lock and unlock a selected lid. The proposed container is relatively easily manufacturable using known components and techniques and the proposed lock is relatively easily retrofittable to existing containers.

In some embodiments of the invention, more than two compartments are provided in a container. Also, in other embodiments of the invention, only one lid is provided and operation of the lock selectively locked and unlocked this single lid.

Other objects, advantages and features of the present invention will become more apparent upon reading of the following non-restrictive description of preferred embodiments thereof, given by way of example only with reference to the accompanying drawings.

BRIEF DESCRIPTION OF THE DRAWINGS

In the appended drawing:

FIG. 1, in a front elevation view, illustrates a container, the container including a lock in accordance with an embodiment of the present invention;

FIG. 2, in a side elevation view, illustrates the container shown in FIG. 1;

FIG. 3, in a perspective view, illustrates the lock of the container shown in FIGS. 1 to 2 and two lids of these same container;

FIG. 4, in an alternative perspective view, illustrates the lids and lock shown in FIG. 3, the lock being shown in a lock first configuration; and FIG. 5, in a perspective view similar to that of FIG. 4, illustrates the lids and lock shown in FIGS. 3 and 4, the lock being shown in a lock second configuration.

DETAILED DESCRIPTION

Referring to FIGS. 1 and 2, there is shown a container 10 in accordance with an embodiment of the present invention. The container 10 includes a container bottom wall 12, a substantially opposed container top wall 18 and a container peripheral wall 14 extending therebetween. The container bottom, peripheral and top walls 12, 14 and 18, all shown in phantom lines, form a closed enclosure for containing materials. In some embodiments of the invention, lift attachments 16 in the form of generally horizontally oriented substantially elongated sleeves are provided on substantially opposed sides of the container peripheral wall 14 and are adapted for receiving conventional forks of a fork lift equipped truck.

As seen in FIG. 1, the container 10 defines container first and second apertures 20 and 22 which are, typically but by no means exclusively, provided in the container top wall 18. For example, the container first and second apertures 20 and 22 are similar in size and are provided in a side by side relationship relatively to each other. First and second lids 24 and 26 are provided for selectively covering and freeing the container first and second apertures 20 and 22. Typically, the first and second lids 24 and 26 are hingedly attached to the container top wall 18 respectively substantially adjacent the container first and second apertures 20 and 22 so as to be pivotably movable between a lid closed position and a lid opened position for respectively blocking and freeing the container first and second apertures 20 and 22.

Typically, the container 10 also includes a container internal wall 28 extending substantially upwardly from the container bottom wall 12 inside the enclosure defined by the container bottom, peripheral and top walls 12, 14 and 18, within the container peripheral wall 14, and dividing the enclosure into a first compartment 30 and a second compartment 32. Typically, the first and second compartments 30 and 32 are configured and sized such that the first and second lids 24 and 26 and the container first and second apertures 20 and 22 allow respectively exclusive access to the first and second compartments 30 and 32. In some embodiments of the invention, the first and second compartments 30 and 32 are usable for containing different materials that must be separated for collection by different contractors or, at least, must be collected in different containers in the truck of a single contractor. To that effect, a lock 34 is provided for selectively alternatively allowing access to only one of the first and second compartments 30 and 32 by selectively locking one of the first and second lids 24 and 26.

Referring to FIGS. 4 and 5, each of the first and second lids 24 and 26 includes a substantially panel-shaped lid body 36 that is dimensioned so as to be able to substantially obstruct the container first and second apertures 20 and 22 (both not shown in FIGS. 4 and 5) when respectively the first and second lids 24 and 26 are in the closed positions. A lid locking flange 38 extends from the lid body 36 substantially adjacent a peripheral edge thereof. The lid locking flange 38 is typically located substantially opposed to the location at which the lid body 36 is hingedly attached to the container top wall 18 and extends substantially perpendicularly to the lid body 36 toward the lock 34. The lid locking flange 38 defines a lid locking aperture 40 extending therethrough, for example substantially parallel to the lid body 36, for allowing locking of the first and second lids 24 and 26. The lid locking flange 38 forms a lid locking element extending from the lid body 36 for selectively locking the first and second lids 24 and 26 in the lid closed positions in cooperation with the lock 34.

The lock 34 is configurable between a lock first configuration, shown in FIG. 4, and a lock second configuration, shown in FIG. 5. In the lock first configuration, with the first lid in the lid closed position, the first lid 24 is locked in the lid closed position by the lock 34 and the second lid 26 is freely movable between the lid opened and closed positions. In the lock second configuration, with the second lid in the lid closed position, the second lid 26 is locked in the lid closed position by the lock 34 and the first lid 24 is freely movable between the lid opened and closed positions.

To achieve this functionality, the lock 34 includes a lock body 44 that has a substantially elongated configuration and defines a lock longitudinal axis 45. The lock body 44 is provided substantially adjacent the container top wall 18 and extends along the container peripheral wall 14 at a location substantially opposed to the location at which the first and second lids 24 and 26 are attached to the container top wall 18. In some embodiments of the invention, the lock body 44 is integrally formed in the container 10. In other embodiments of the invention, the lock body 44 is attached to the container 10 after the remainder of the container 10 has been manufactured which, in some embodiments of the invention, allows for retrofitting existing containers 10 with the proposed lock 34.

The lock 34 also includes a lock actuator 46 mounted to the lock body 44 and locking pins 48 operatively coupled to the lock actuator 46 so as to be movable relatively to the lock body 44 to selectively engage one of the lid locking apertures 40. The lock actuator 46 selectively moves the lock 34 between the lock first and second configurations.

More specifically, the lock body 44 includes a body peripheral wall 50 having a substantially U-shaped transversal cross-sectional configuration, flange receiving apertures 42 being provided in the body peripheral wall 50 substantially adjacent to the container top wall 18 for allowing insertion of the lid locking flanges 38 therethrough. Actuator apertures 52 are also provided for allowing mounting therethrough of a portion of the actuator 46, as described in further details hereinbelow.

Furthermore, actuator mounting flanges are provided to allow mounting of the lock actuator 46 to the lock body 44. For example, but by no means exclusively, the actuator mounting flanges include a pair of substantially opposed longitudinal flanges 56 each extending from a respective end of the lock body 44 substantially parallel to and spaced apart from the front portion of the body peripheral wall 50. The actuator mounting flanges also include transversal flanges of a first type 58 extending substantially perpendicularly to the longitudinal flanges 56 substantially adjacent the end thereof located inside the lock body 44. For example, to enhance the rigidity of the lock 34, the transversal flanges of the first type 58 are located substantially adjacent to the flange receiving apertures 42. Transversal flanges of a second type 60 are provided substantially in the mid-section of the lock body 44 and are provided for mounting the lock actuator 46 thereto.

Flange apertures 62 extend through each of the longitudinal flanges 56 substantially in register with the actuator apertures 52. Other flange apertures 66 extend through the transversal flanges of the second type 60 and are substantially longitudinally aligned with each other. Sheaths 68 having a substantially L-shaped configuration are provided and mounted to the lock body 44 and the longitudinal flanges 56.

The sheaths 68 are substantially rigid and have an end thereof extending into the lock 34 from the actuator aperture 52. The sheaths 68 are inserted through the flange apertures 62 where they curve so as to extend substantially longitudinally up to a location substantially adjacent the transversal flanges of the first type 58. The sheaths 68 are mounted to the lock body 44 so as to substantially fixed relatively thereto.

In some embodiments of the invention, as better seen, for example, in FIG. 3, maintenance apertures 70 are provided in the lock body 44 for allowing access to the lock actuator 46. The maintenance apertures 70 are typically each covered in regular use by a maintenance lid 73 that is fastened to the lock body 44 substantially in register with the maintenance apertures 70 in a conventional manner, for example, using screws.

Returning to FIGS. 4 and 5, the lock actuator 46 includes an actuator base 74 that is mounted to the lock body 44 for substantially longitudinal reciprocating movement thereolong. The actuator base 74 is, in the specific embodiment of the invention shown in the drawings, substantially plate-shaped and mounted through the flange apertures 66 between the two lid locking flanges 38. Actuating cables 72 extend substantially longitudinally from the actuator base 74 in substantially opposite directions, longitudinally oriented with respect to the lock body 44, and each extend through a respective sheath 68. so as to protrude outwardly from the lock body 44 through the actuator apertures 52. Therefore, each of the actuating cables 72 extends through a respective one of the sheaths 68 so as to protrude outwardly from the lock body 44 substantially transversely.

Buttons 78 are secured to the actuating cables 76 outside of the lock body 44, substantially adjacent a respective one of the sheaths. The buttons 78 are provided in a substantially side-by-side relationship with respect to each other. Locking pins 48 are secured to the actuator base 74 and are configured and sized such that when the actuator base 74 reciprocates inside the lock body 44, only one of the locking pins 48 engages one of the two lid locking apertures 40. More specifically, when the lock is in the lock first configuration, one of the locking pins 48 engages the lid locking aperture 40 of the first lid 24 and the other locking pin 48 is substantially retracted from the lid locking aperture 40 of the second lid 26. In the locked second configuration, the reverse relationship holds. In some embodiments of the invention, the locking pins 48 each extend substantially longitudinally away from opposite sides of the actuator base 74. The locking pins 48 are movable in a reciprocating movement relatively to the lid locking flanges 38 when the lock 34 is moved between the lock first and second configurations. The lock actuator 46 is thus operatively coupled to the locking pins 48 for moving the locking pins 48 with respect to the lid locking flanges 38 when the lock actuator 46 is actuated.

In use, pressing on one of the two buttons 78 exerts a force of the actuating cable 76 to which this button 78 is attached. The force is transmitted to the actuator base 74 and pushes the actuator base 74 in the direction leading substantially away from the button 78 that is pressed. This movement retracts the locking pin 48 that is located closest to the button 78 from its respective locking aperture 40 and, therefore, unlocks the lid from the first and second lids 24 and 26 that is substantially adjacent to the actuated button 78. This movement also inserts the locking pin 48 that is located furthest from the button 78 from its respective locking aperture 40 and, therefore, locks the lid from the first and second lids 24 and 26 that is substantially adjacent to the non-actuated button 78. Pressing on other button 78 performs the same operation for the other lid and, therefore, allows unlocking of this other lid and locking of the first lid.

Although the present invention has been described hereinabove by way of preferred embodiments thereof, it can be modified, without departing from the spirit and nature of the subject invention as defined in the appended claims.

What is claimed is:

1. A container, said container comprising:
   a container bottom wall;
   a container peripheral wall extending substantially upwardly from said container bottom wall;
   a container top wall extending from said container peripheral wall substantially opposed to said container bottom wall, said container top wall defining a container first aperture and a container second aperture each extending therethrough;
   a first lid and a second lid, said first and second lids being operatively coupled to said container so as to be each movable between a lid closed position and a lid open position for respectively selectively blocking and freeing a respective one of said container first and second apertures; and
   a lock, said lock being configurable between a lock first configuration and a lock second configuration, wherein
      in said lock first configuration, with said first lid in said lid closed position, said first lid is locked in said lid closed position by said lock and said second lid is freely movable between said lid open and closed positions;
      in said lock second configuration, with said second lid in said lid closed position, said second lid is locked in said lid closed position by said lock and said first lid is freely movable between said lid open and closed positions; and
      with said first and second lids in said lid closed positions, said lock always prevents simultaneous movement of said first and second lids from said lid closed positions to said lid open positions so that at any time, only one of said first and second lids is movable between said lid open and closed positions.

2. A container as defined in claim 1, further comprising a container internal wall extending substantially upwardly from said container bottom wall within said container peripheral wall.

3. A container as defined in claim 2, wherein said container internal wall divides said container into a first compartment and a second compartment.

4. A container as defined in claim 3, wherein said first and second compartments are configured and sized such that said container first and second apertures allow respectively exclusive access to said first and second compartments.

5. A container as defined in claim 1, wherein said lock includes a lock actuator for selectively moving said lock between said lock first and second configurations.

6. A container as defined in claim 1, wherein said first and second lids are hingedly attached to said container top wall respectively substantially adjacent said container first and second apertures so as to be each pivotable between said lid closed and opened positions.

7. A container as defined in claim 1, wherein each of said first and second lids includes
   a lid body configured and sized for substantially obstructing respectively said container first and second apertures when respectively said first and second lids are in said closed positions; and
   a lid locking element extending from said lid body for selectively locking said first and second lids in said lid closed positions in cooperation with said lock.

8. A container as defined in claim 7, wherein
   said lid locking element of each of said first and second lids includes a lid locking flange defining a lid locking aperture; and
   said lock includes two locking pins movable in a reciprocating movement relative to said lid locking flanges when said lock is moved between said lock first and second configurations, a first one of said locking pins being inserted in said lid locking aperture of said first lid and a second one of said locking pins being retracted from said lid locking aperture of said second lid when said lock is in said lock first configuration, said first one of said locking pins being retracted from said lid locking aperture of said first lid and said second one of said locking pins being inserted in said lid locking aperture of said second lid when said lock is in said lock second configuration.

9. A container as defined in claim 8, wherein said first and second lids are hingedly attached to said container top wall substantially opposed to said lid locking flanges.

10. A container as defined in claim 8, wherein said lock includes a lock actuator for selectively moving said lock between said lock first and second configurations, said lock actuator being operatively coupled to said locking pins for moving said locking pins with respect to said lid locking flanges when said lock actuator is actuated.

11. A container as defined in claim 10, wherein said lock actuator includes two buttons, said buttons causing said locking pins to move in opposite directions with respect to said lid locking flanges when said button are pushed.

12. A container as defined in claim 10, wherein said buttons are provided in a substantially side-by-side relationship with respect to each other.

13. A container as defined in claim 10, wherein said lock includes a lock body having a substantially elongated configuration and extending along said container peripheral wall substantially adjacent said container top wall, said lock actuator including an actuator base mounted to said lock body between said lid locking flanges so as to be movable substantially longitudinally with respect to said lock body in a reciprocating movement along said lock body, said locking pins being mounted to said actuator base, said lock actuator further including a pair of actuating cables extending from said actuator base in substantially opposite directions oriented substantially longitudinally with respect to said lock body, said actuating cables protruding from said lock body.

14. A container as defined in claim 13, wherein said locking pins extend each longitudinally from said actuator base in substantially opposite directions longitudinally oriented with respect to said lock body.

15. A container as defined in claim 13, wherein said actuator includes two buttons each secured to a respective one of said actuating cables outside of said lock body.

16. A container as defined in claim 15, wherein said lock includes a pair of substantially L-shaped sheaths secured to said lock body substantially longitudinally opposed to each other, each of said actuating cables extending through a respective one of said sheaths so as to protrude outwardly from said lock body substantially transversely.

17. A container as defined in claim 16, wherein said sheaths are substantially rigid.

18. A container as defined in claim 16, wherein said buttons are secured to said actuating cables substantially adjacent a respective one of said sheaths.

19. A container, said container comprising:
   a container bottom wall;
   a container peripheral wall extending substantially upwardly from said container bottom wall;

a container top wall extending from said container peripheral wall substantially opposed to said container bottom wall, said container top wall defining a container first aperture and a container second aperture each extending therethrough;

a first lid and a second lid, said first and second lids being operatively coupled to said container so as to be each movable between a lid closed position and a lid open position for respectively selectively blocking and freeing a respective one of said container first and second apertures; and a lock, said lock being configurable between a lock first configuration and a lock second configuration, wherein in said lock first configuration, with said first lid in said lid closed position, said first lid is locked in said lid closed position by said lock and said second lid is freely movable between said lid open and closed positions; and in said lock second configuration, with said second lid in said lid closed position, said second lid is locked in said lid closed position by said lock and said first lid is freely movable between said lid open and closed positions;

each of said first and second lids including a lid body configured and sized for substantially obstructing respectively said container first and second apertures when respectively said first and second lids are in said closed positions;

a lid locking element extending from said lid body for selectively locking said first and second lids in said lid closed positions in cooperation with said lock, said lid locking element including a lid locking flange defining a respective lid locking aperture;

said lock including two locking pins movable in a reciprocating movement relative to said lid locking flanges when said lock is moved between said lock first and second configurations, a first one of said locking pins being inserted in said lid locking aperture of said first lid and a second one of said locking pins being retracted from said lid locking aperture of said second lid when said lock is in said lock first configuration, said first one of said locking pins being retracted from said lid locking aperture of said first lid and said second one of said locking pins being inserted in said lid locking aperture of said second lid when said lock is in said lock second configuration, a lock actuator for selectively moving said lock between said lock first and second configurations, said lock actuator being operatively coupled to said locking pins for moving said locking pins with respect to said lid locking flanges when said lock actuator is actuated; and a lock body having a substantially elongated configuration and extending along said container peripheral wall substantially adjacent said container top wall, said lock actuator including an actuator base mounted to said lock body between said lid locking flanges so as to be movable substantially longitudinally with respect to said lock body in a reciprocating movement along said lock body, said locking pins being mounted to said actuator base, said lock actuator further including a pair of actuating cables extending from said actuator base in substantially opposite directions oriented substantially longitudinally with respect to said lock body, said actuating cables protruding from said lock body.

* * * * *